Nov. 5, 1963    R. S. GOODYEAR    3,109,227
UNIFORM THERMISTOR MANUFACTURE
Filed Nov. 5, 1962    3 Sheets-Sheet 1

BATCH P

INVENTOR.
ROBERT S. GOODYEAR
BY
ATTORNEYS

3,109,227
UNIFORM THERMISTOR MANUFACTURE
Robert S. Goodyear, Framingham, Mass., assignor to Fenwal Electronics, Inc., Framingham, Mass., a corporation of Massachusetts
Filed Nov. 5, 1962, Ser. No. 235,922
5 Claims. (Cl. 29—155.62)

This invention relates to the manufacture of thermal resistors, or temperature sensing semi-conductor or resistance devices, and more particularly to the manufacture of thermistors, which are thermal resistors whose electrical resistance changes with absolute temperature, and which have a high negative temperature coefficient of resistance.

The invention is concerned with the fabricating of thermistors for use for example in temperature compensation, measurement and control, and wherein the resistance-temperature characteristic as distinguished from the voltage-current characteristic of the thermistors is utilized.

Thermistors are superior in a number of respects to the other devices available for measuring and controlling temperature. One advantage is that, since the resistance of a thermistor is a function of its absolute temperature, it is merely necessary to measure the resistance to know the exact temperature of the thermistor, no reference temperature being required as is the case with thermocouples.

Another desirable characteristic is the high resistance values which the thermistors can be made to have, whereby they may be measured with circuits of moderately high potential and low current, eliminating the necessity of heavy conductors and sensitive measuring equipment. Thus the wiring can be any ordinary copper wire, and simple ohmmeters are adequate. The use of the high voltages and low currents as contrasted with the low voltages and high currents of thermocouple devices permits also the easy switching from one thermistor to another and with ordinary switches, as in multiple circuits.

Further, by using high-resistance thermistors remote measurements can be made without any special wiring, because for the ordinary copper wires the changes in resistance with ambient temperature changes are so small, as compared to the similarly induced changes in resistance of the thermistors, that negligible errors are introduced.

Yet another advantage of the thermistors is that their inherent sensitivity, together with their ability to be employed or coupled in simple electrical or electronic circuits, affords them a far greater precision in measurement and control of temperature. The great sensitivity and accuracy of which the thermistors are inherently capable is emphasized by comparison with the resistance variation of platinum. Between the temperatures of —100° C. and 400° C. there is a change of ten million to one in resistance of the thermistor materials, whereas the platinum resistance changes by only ten to one over the same temperature range.

For these and other reasons the thermistors here concerned are preferred for and are in increasing use in numerous and varied scientific, industrial, and military applications.

For many of these applications, as, for particular example, in the case of resistance thermometers, it is desired that the thermistors be identical or reproducible in manufacture, and so replaceable or interchangeable in use, in respect to their resistance-temperature characteristic.

That is, it is desired to control the manufacture of all the thermistors made up to the same specification so precisely or uniformly that all thermistors of a given lot will conform or measure to the same resistance-temperature curve, within very close tolerances. For only under these conditions—i.e. only if they have substantially the same resistance-temperature characteristic—can the thermistors be used as interchangeable replaceable sensing elements of a temperature measuring or controlling apparatus, without introducing substantial errors or inaccuracies in the resistance-temperature indication by that apparatus.

Thus the use of thermistors has heretofore been severely restricted by the inability of the art to make or conform the thermistors to the same identical resistance-temperature characteristic. It has not been possible in the prior practice to produce thermistors to the precise identical resistance-temperature characteristic because that characteristic or curve is compounded of two independent variables, namely, the resistance and the slope. That is, the position of the temperature resistance curve of a thermistor, at any given point, depends upon or varies with the amount of material used in the thermistor; and the direction of the curve, or its slope through that given point, depends upon or varies with the composition of that material.

The resistance and slope are variable as between one thermistor and another because the thermistors cannot be manufactured, at least under present techniques, to have precisely the same body and composition. The high temperature coefficient of the thermistors, earlier referred to, will be seen to require production of thermistors of correspondingly high uniformity, that they may have resistance-temperature curves which duplicate one another, or at least correspond within a tolerance close or small enough to qualify the thermistors as interchangeable or replaceable.

Thus in the thermistor production of the prior art the resistances of even carefully selected thermistor units will vary by as much as from ten to twenty percent from the nominal at a given temperature, and these same units will vary also in slope (which is expressed in terms of the ratio of the resistance at 0° C. to the resistance at 50° C.) by a factor of several percent.

Hence in the conventional practice of thermistor manufacture it has been necessary to establish tolerances, or limits of resistance-temperature curve variation, within which the thermistors are acceptable as manufactured essentially or substantially to the same or standard specification. For industrial applications the resistance tolerance now generally accepted is ±20%, with which must be compounded the normal tolerance in slope, that being from 3 to 10% depending upon the material employed.

For an example by which to convert these standard tolerances to degrees of possible error, assume that the material used is one which can be manufactured to the lowest or 3% tolerance in slope, and that two thermistors of that material are selected to have identical resistances at 25° C. It will be seen that the resistance values of the selected thermistors at 200° C. may differ, due alone to the 3% variation in slope, by as much as 10° C., or by more than 5% of the temperature range over which the measurements are being made. For any heretofore manufactured group of thermistors acceptable as varying within the stated ±20% from the nominal at 25° C., the possible range or percentage of error at 200° C. is, of course, far greater.

In accordance with this invention thermistors are novelly manufactured to conform to the same identical resistance temperature curve within close tolerances and over a wide or the entire operative temperature range. The tolerances which are possible with the invention may be as close as plus or minus one-tenth of one percent (±0.1%), or, for degrees of temperature example, to within about two one-hundredths of a degree (0.02°) over the operative range 25°–200° C.

The method of the invention provides also for controlling the tolerance, which may be held within any desired range down to the limit of accuracy of the resistance measurement. The tolerances which may be fixed under the invention are as just indicated far closer than those heretofore possible, and may be whatever is required to render the thermistors interchangeable in use. To illustrate, a tolerance which may be acceptable for certain applications of the invention thermistors may be ±0.2%, or half as close as the above stated ±0.1%, but still one hundred times closer than the conventional tolerance for single thermistors of ±20%.

The invention method is distinguished more particularly by a unique process of thermistor element matching, by which composite thermistors are made up to match a selected or nominal resistance-temperature curve at two points and thereby caused or required to conform to or meet that curve at all points in the operative range, within the desired tolerance.

Those skilled in the art will readily appreciate that the invention will greatly expand the use of thermistors in instrumentation, and that it makes possible the use of large quantities of thermistors in, for example, multi-point temperature measuring instruments and the like. The thermistors of the invention can be expected more generally to meet the rigid requirements of, and so to replace thermocouples as the prime source of temperature measurement in, such equipment as jet aircraft, guided missiles and satellites.

A thermistor comprises essentially a small mass of semi-conductor composition. Any such mass is for convenience herein referred to as a thermistor body. Such bodies differ in physical size from minute specks comparable to a common pin point up to sizes approximating B-B shot, small peas, or larger. Thermistor bodies also are of various shapes, including beads, discs, washers, rods, flakes or other useful forms; the masses $b$ of FIGS. 1, 2, 4 and 5 are representative of any such thermistor bodies.

In a thermistor the body has terminal means providing for electrical connection at spaced points or areas thereof, such as lead wires, conductive surfaces or other contact means. Such terminalized body is herein referred to as "thermistor element," designated by the lower-case letter $e$ on the drawings. These thermistor elements $e$ may be coated, sealed, housed in envelopes or cartridges, or otherwise adapted for connection and mounting in circuitry for the particular use.

While such single thermistor element of itself is a thermistor in the language of the commercial art, said expression "thermistor elements," namely thermistor bodies terminalized, is herein used to differentiate from the composite thermistor units, assemblies or devices of the invention comprising an integrated plurality of thermistor elements. Accordingly the term "thermistor" herein generally signifies the commercial end product. Thus with reference to the prior art a "thermistor" may be what is herein called "thermistor element." And as applied directly to the present invention "thermistor" intends the composite thermistor device, assembly or unit which is the end product resultant from the process of the invention, e.g. $T_s$ of FIG. 1 or $T_p$ of FIG. 2.

In aid of a full and clear understanding of the setting and application of the invention in and to the art it is here pointed out also that the materials having the properties of thermistors embrace non-metallic or ceramic semi-conductors which are characterized by or can be controlled in manufacture to have a definite high temperature coefficient. Numerous metallic oxides and mixtures thereof are suited to the purpose. Some of those commonly used for thermistors are manganese oxide, nickel oxide and cobalt oxide; also magnesium oxide, zirconium oxide and cerium oxide. Various considerations govern the selection of the thermistor material for a given application, including especially the over-all operational range of temperatures likely to be encountered. Hence some metallic oxides are recognized as useful more particularly in high-temperature thermistors, among these being chromic oxide and in a few special types uranium oxide. However test results to date indicate that this invention is equally applicable to any of the oxides or other substances suitable for thermistor manufacture. Again, the principles of the invention are believed to extend to any of the materials having semi-conductive property adaptable for thermistor purposes.

It may be pointed out still further, by way of introduction that some of the materials and combinations thereof in this class have a useful temperature range in thermistor use of for example 0° to 300° C. Others are found to function satisfactorily through a range from −50° to 390° C. or higher. Still others of them are capable of thermistor performance up to temperatures as high as 1000° C. Thus it is possible with thermistors to cover the whole temperature range from as low as −250° C. or approaching absolute zero up to or in excess of 1000° C.

Figure 4:
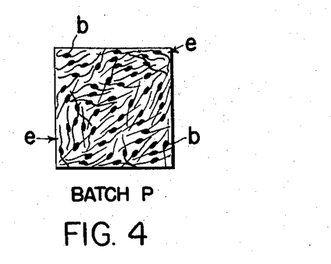
FIG. 4 represents a single manufacturing batch of thermistor components.

Considering now more particularly the method of the invention, in a first or beginning step thereof I make up one or more manufacturing batches of thermistor bodies $b$ and elements $e$ following any known or preferred technique therefor. One such manufacturing batch is represented in FIG. 4, there designated "Batch P."

For exemplary illustration of the known methods of preparing what I term the thermistor bodies and elements, reference is made to the disclosure of the following U.S. patents: W. F. Janssen, 21,219,365; R. O. Grisdale, 2,258,646; E. F. Dearborn, 2,274,592; H. L. B. Gould et al., 2,274,830; E. F. Dearborn et al., 2,282,944; and Carl J. Christensen, 2,298,679, which patent disclosures are herein incorporated by reference.

In the fabricating of the thermistor bodies and terminalizing of the thermistor elements in accordance with the cited patent and other prior teachings appropriate hereto, the constituent oxide materials are first obtained in or reduced to powdered or small granular form. According to one procedure appropriate quantities thereof are placed in more or less segregated array on trays, plates or the like and subjected to sintering heat as in an oven or furnace. This results in the formation of the multiplicity of thermistor bodies $b$ of each batch, these being agglomerations or clusters of the material resulting in the course of the sintering heat treatment. Terminalizing, that is, application of the provision for electrical connection, as by bonding conductive lead wires or conductive surfacing to spaced locations on the thermistor bodies, may be effected during such sintering operation or subsequently as may be preferred. As already noted, the installing on the thermistor bodies of the leads or other provision for conductive connection, coincident with or subsequent to the sintering, produces what are herein called the thermistor elements, designated $e$ on the drawings.

It will be understood that the aforementioned manufacturing batches may comprise any substantial number of bodies $b$ and elements $e$, such as 30, 200, 1000 or more, according to manufacturing preference and the heat-treating facilities available. The term "batch" as herein employed refers, again and more particularly, to any multiplicity of the bodies b or of the elements e made from the same oxide or thermistor material and intended for use under generally similar use conditions, as for example in a given temperature range. In the practice of the invention one or a number of such batches may be prepared, such as to be roughly similar in structure under conventional manufacturing procedure.

This invention proceeds from the discovery that if a composite thermistor unit (i.e. a plurality of electrically connected thermistor elements) is found to match or approach within a limit of tolerance a predetermined or nominal resistance-temperature curve at any two spaced temperature points, said composite thermistor unit will prove to conform to the nominal curve also at all points between those two matching temperatures. I have found more particularly that the temperature resistance curves of thermistor units made up in accordance with the invention, that is by assembling and connecting a plurality of thermistor elements whose combined resistance equals or matches that of a desired curve at two spaced points, will progress uniformly relative to the nominal curve through all temperature points intermediate the match points.

Thus if the curve of the composite thermistor unit of the invention varies from the nominal curve in the same direction and by the same amount or tolerance at both matching points, then the curve of the thermistor will have a uniform tolerance; i.e. it will parallel the nominal curve throughout the intervening temperatures. Or if the composite thermistor departs from the nominal in the same direction but by different amounts at the two matching points the thermistor will have a tapered tolerance; i.e. it will uniformly progress in an opening or closing direction relative to the nominal, from one matching point to the other. Again, if the invention thermistor registers above the nominal at one matching temperature and falls below the nominal at the other matching temperature, then the curve of the thermistor of the invention will have a uniform progression between those temperatures from one side of the nominal to the other. And in all cases the tolerance will not at any intermediate point exceed the tolerance at the matching points.

Figure 6:
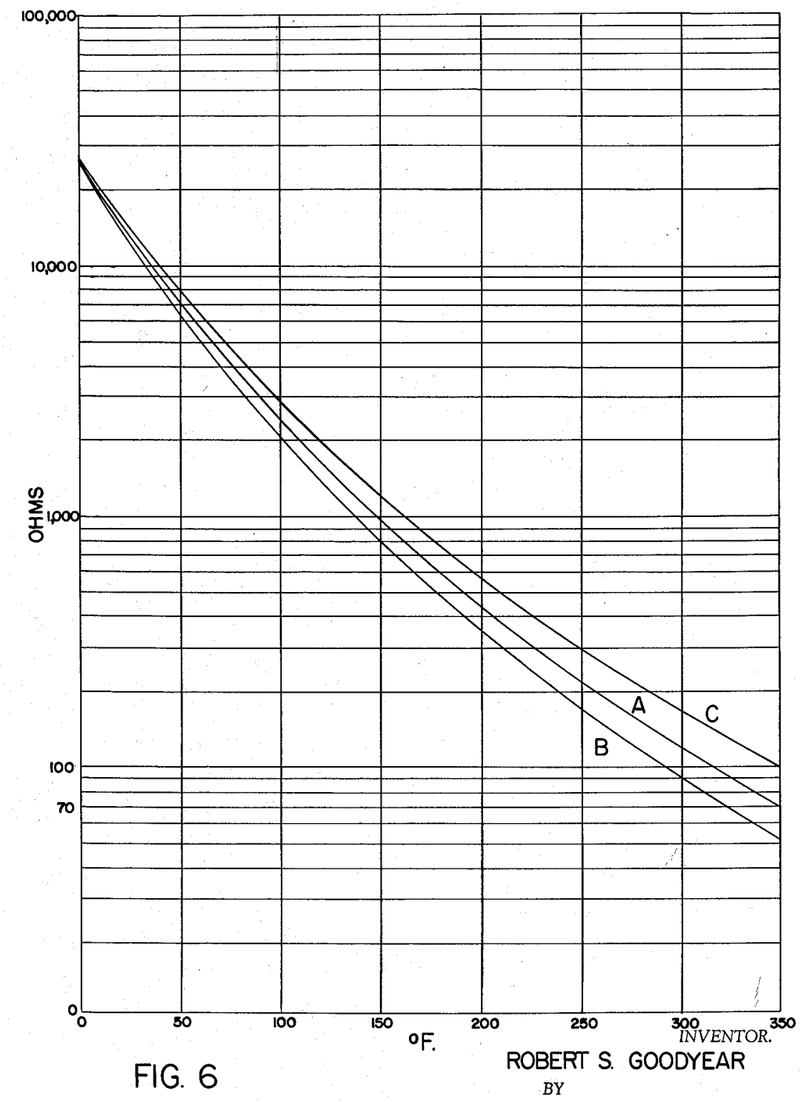
FIG. 6 shows characteristic resistance-temperature curves for typical thermistors made by standard methods compared to the resistance-temperature curve for thermistor units in accordance with the invention.

The preparation under the invention of identical or reproducible thermistors, meaning thermistors which are replaceable or interchangeable as conforming or measuring to the same desired predetermined or nominal resistance-temperature curve, is emphasized in FIG. 6, by comparison there with resistance-temperature curves exemplary of the prior art. In FIG. 6 the middle curve A represents the nominal curve to which it is desired all thermistors should conform, and curves B and C represent the curves of prior thermistors which match the 26,000 ohms resistance of the nominal curve at 0° F., but which exhibit the maximum variance in slope from the nominal which is permissible in standard practice, on the low and high side respectively. Thus it will be seen that in the prior practice even where there are chosen thermistors which are matched exactly at 0° F. the resistances can vary by nearly 50 ohms at 350° F. Or to put it another way, at a resistance of 100 ohms the possible error in temperature reading is about 60° F.

It will be understood that, inasmuch as the resistance and slope variables are as heretofore mentioned independent of one another, for any given thermistor the actual error at any point along the curve other than the measured point cannot be predicted, but can only be said to fall somewhere within the envelope defined by the two stated variables of resistance and slope, considered in relation to the nominal. Thus, again, if from the thermistors which are acceptable under the prior art practice only those which match the desired curve exactly at some point (as in FIG. 6 at 0° F.) are chosen, even as to these there will be found a pattern of error which is random or unpredictable as to the individual thermistors, and which for the thermistor group will increase in width or range of error along the curve in the direction away from the single matching point (as in FIG. 6 towards 350° F.).

Under this invention, by contrast, thermistor units are made up to match the nominal curve A at 0° F. and also at 350° F., and so as still further to conform to that curve at all points in between. And as already mentioned the tolerance or degree of preciseness with which the thermistors of the invention everywhere match the nominal is itself controllable, and limited solely by the limit of accuracy with which the individual resistances may be measured. Thus it may be determined that the composite thermistors shall match to the nominal to within the stated 0.1%, as at the FIG. 6 matching points of 0° and 350° F., and in which case they will be found to deviate from the nominal by no more than that same 0.1% at every point along the 0°–350° F. curve. To emphasize graphically the precision or accuracy with which thermistor manufacture is carried out under the invention, in the given 0.1% tolerance example the possible deviations from the nominal will all be such as comprehended by the thickness of the line with which curve A is drawn in FIG. 6.

It will be appreciated that since the temperature coefficients of thermistors are different at different temperatures, the same temperature degree tolerance equates with different percentage tolerances at the different matching points, and vice versa. Thus to establish the same constant ±.5 temperature degrees (F.) tolerance at the matching points of 0° F. and 350° F. would, because of the differing temperature coefficients, require fixing one resistance percentage tolerance of, say, 1.4 at the low (0° F.) matching point, and a different resistance percentage tolerance of, say, 0.5 at the high (350° F.) matching point. Whereby, again, the same or different tolerances may be fixed or employed at the different matching points, and the tolerance envelope may parallel the nominal, or it may taper—i.e. close to or open from the nominal, in progressing from one to the other of the matching points.

The desired or nominal resistance-temperature curve to which the thermistors are to be matched may be predetermined, as in a particular use specification. Or the nominal curve may be derived for convenience in matching, by averaging the resistance values of the individual thermistor elements of a given manufacturing batch. The resistance values must be found empirically, or by actual measurement, because no mathematical formula is known for the resistance-temperature curve of a thermistor.

To find the convenient nominal for a particular manufacturing batch there are individually measured the resistances of all or a substantial number of the elements e of such a manufacturing batch, as indicated in P of FIG. 4, at two substantially spaced points or temperature levels in the operative range. The matching points may be at the limits of the operative range, or they may be points substantially spaced within those limits and which are selected or preferred for convenience in measuring. But if the latter are used the tolerances fixed for these interior points will be less than those acceptable at the limit points of the range, by an amount dependent upon the slope angle or deviation.

The resistance measurements or calibrations are carried out in known manner, as by connecting the thermistor elements to a sensitive metering device such as a Wheatstone bridge, and then dipping or immersing the elements in a controlled temperature bath. Next the resistance readings of the individual elements are totaled up, and divided by the number of thermistor elements in the batch, to find the average of the element resistances at the two matching points, or in other words the resistances which are characteristc of the given manufacturing batch, at those points.

The resultant average resistance values at the two spaced matching temperature points are then multiplied or divided, according as the elements e are connected in series or parallel in the composite thermistor unit of the invention, and by a factor corresponding to the number of elements to be used. For example if the thermistor unit is to comprise two or a pair of series-connected thermistor elements, the averaged or characteristic resistance values are doubled.

The last mentioned operation produces what may be termed the objective identical resistances, or the match point resistance values of the nominal resistance-temperature curve to which it is desired that the thermistor units made up from the given manufacturing batch shall conform.

To plot the nominal curve derived or arrived at in this way, in the described series-connected element pair example, a pair of thermistor elements is first selected the sum of whose resistances equals the objective identical resistance at the two matching temperature points. The selected element pair is then electrically connected and its aggregate or combined resistance is measured at intervals throughout the operative range. The measurement may be carried out at every degree of temperature, or it may be done at intervals of several degrees and the intermediate values extrapolated with sufficient accuracy by a mathematical technique not a part of the invention.

Next the limits of the tolerances within which the composite thermistors must match the nominal are tabulated for the given manufacturing batch. Assuming an operative range of 32 to 300° F., a nominal curve whose resistance values are 11,400 and 120.3 ohms respectively at the said 32° and 300° F. limit values, and a uniform tolerance of 1½%, then the low, nominal and high resistance values for the stated series-connected element pair example may be tabulated at the limit or matching temperatures as follows:

| Temperature | Low | Nominal | High |
|---|---|---|---|
| 32° F | 11,229 | 11,400 | 11,571 |
| 300° F | 118.5 | 120.3 | 122.1 |

The resistances of all the individual thermistor elements of the batch are then calibrated at the two matching temperatures, and the measurements taken off or recorded. For convenience and to avoid error the thermistor elements may be placed in individual packages or envelopes, and the resistance values recorded directly on the envelopes. To illustrate, the resistance values of an exemplary series of ten thermistor elements of a manufacturing batch might be recorded as follows:

| No | 1 | 2 | 3 | 4 | 5 |
|---|---|---|---|---|---|
| 32° F | 5,336 | 5,600 | 5,637 | 5,642 | 5,659 |
| 300° F | 56.30 | 60.74 | 58.91 | 58.66 | 58.30 |

| No | 6 | 7 | 8 | 9 | 10 |
|---|---|---|---|---|---|
| 32° F | 5,760 | 5,762 | 5,768 | 5,789 | 6,092 |
| 300° F | 61.73 | 62.65 | 61.66 | 59.93 | 63.02 |

The thermistor elements or their envelopes are then for convenience arranged in numerical order of resistance values at one matching point. It will be seen that the arrangement of the ten thermistor elements above listed is in the order or sequence running from the lowest to the highest resistance number, at the low matching point.

Further in respect to the exemplary procedure as here concerned, the matching is then commenced by taking the element or envelope comprising the lowest resistance value at the low matching point and selecting from amongst the ones with the highest resistance values all those elements which, when combined with the said lowest value element, will match the nominal at that temperature, within the determined limits of tolerance.

For example, in matching the ten exemplary thermistor elements to the 32–300° F. nominal curve above mentioned, and taking the lowest resistance value or No. 1 thermistor element, it will be seen that its 5336 ohms resistance can be added to the resistance value of element No. 10 to produce a combined resistance whose value is above the 11,229 ohms low, and below the 11,571 ohms high, limit resistance values. From this it will be appreciated that with the usual manufacturing batch, comprising a much larger number of thermistor elements than the exemplary ten, there will commonly be several from among those at the other end of the range or sequence which will combine with the element first chosen from the one end, to yield a composite resistance acceptably matching the nominal.

Returning now to the first (herein lowest or No. 1) thermistor element, i.e. the one with which it is desired to combine to match the nominal, and considering the resistance of that element at the other (herein high) matching point, there is next selected from among the one (herein low) point matching group a thermistor element which best or acceptably matches the nominal at the said other matching point, in combination with the said first thermistor. Referring to the ten element series example, No. 1 is thus found to be matchable with No. 10, because the combined Nos. 1 and 10 resistance of 119.32 ohms falls well within the 118.5–122.1 ohms tolerance at the high point, and in fact comes very close to the 120.3 ohms nominal value there.

To repeat the process description with respect more particularly to the much larger number of elements of a typical batch, the first element of the series with which it is desired to combine will most likely have been found to be pairable with several other elements at the other end of the series, to conform acceptably to the nominal at the first matching point. The first element and its several possible first point pairings are momentarily or temporarily held out or segregated, as by raising their envelopes part way from the file. They are then considered or looked to again to see which from amongst the first point possibles will make an acceptable or the best pair in conforming to the nominal at the second matching point. When from among the first point possibles there is chosen that pair whose combined resistance matches or most nearly approaches the nominal at the second matching point, the remainder of the tentatively considered paring possibles are returned to the normal file position, and the process is begun over again with the second element of the series.

This process is repeated with all the successive thermistor elements of the manufacturing batch, until all or as many as possible of the elements have been combined to match the nominal. It will then be convenient to fasten or staple together the matched, herein paired thermistor elements or their envelopes, and to mark the totals on the uppermost envelope of each pair.

If the invention practice as just described were applied to the ten element example there would be combined Nos. 1 and 10, 2 and 9, 3 and 8, 4 and 7 and 5 and 6, and if in the combining of the envelopes those for Nos. 1, 3, 6, 7 and 9 were placed uppermost, the resistance value data with the totals would appear on these as follows:

| Nos | 1 and 10 | 3 and 8 | 6 and 5 | 7 and 4 | 9 and 2 |
|---|---|---|---|---|---|
| 32° F | 5,336 | 5,637 | 5,760 | 5,762 | 5,789 |
|  | 6,093 | 5,768 | 5,659 | 5,642 | 5,600 |
| Total | 11,429 | 11,405 | 11,419 | 11,404 | 11,389 |
| 300° F | 56.30 | 58.91 | 61.73 | 62.65 | 59.93 |
|  | 63.02 | 61.66 | 58.30 | 58.30 | 60.74 |
| Total | 119.32 | 120.57 | 120.03 | 121.31 | 120.67 |

An alternative marking procedure which facilitates the matching is to record the resistance and tolerance values in terms of the degrees of difference from the nominal. Under this mode of practice, assuming the order of differences chosen is from the lowest to the highest number, the notations assigned to a series of six elements or envelopes with respect to the first matching point might be for example −20, −15, −10, +10, +15, +20, and +30.

In the practice manually of the invention method, as hereinbefore described, the accuracy of the measurement of the individual element resistance values at the two matching points may be checked or proved by performing a third measurement at some intermediate temperature at which it may also be convenient to calibrate the element. Were this done with the ten exemplary thermistor elements the envelope notations might appear as follows:

| No. | 1 | 2 | 3 | 4 | 5 |
|---|---|---|---|---|---|
| 32° F | 5,336 | 5,600 | 5,637 | 5,642 | 5,659 |
| 77° F | 1,873 | 1,973 | 1,970 | 1,977 | 1,973 |
| 300° F | 56.30 | 60.74 | 58.91 | 58.66 | 58.30 |

| No. | 6 | 7 | 8 | 9 | 10 |
|---|---|---|---|---|---|
| 32° F | 5,760 | 5,762 | 5,768 | 5,789 | 6,093 |
| 77° F | 2,028 | 2,044 | 2,029 | 2,020 | 2,130 |
| 300° F | 61.73 | 62.65 | 61.66 | 59.93 | 63.02 |

The tabulation for matching of the thermistors, to the stated curve and tolerance, and with the nominal and limit values at the proofing temperature inserted, might read thus:

| Temperature | Low | Nominal | High |
|---|---|---|---|
| 32° F | 11,229 | 11,400 | 11,571 |
| 77° F | 3,942 | 4,002 | 4,062 |
| 300° F | 118.5 | 120.3 | 122.1 |

The notations on the uppermost element envelopes Nos. 1, 3, 6, 7 and 9 of the five matched pairs would therefore appear, with the third or proofing temperature values and totals included, as follows:

| Nos. | 1 and 10 | 3 and 8 | 6 and 5 | 7 and 4 | 9 and 2 |
|---|---|---|---|---|---|
| 32° F | 5,336 | 5,637 | 5,760 | 5,762 | 5,789 |
|  | 6,093 | 5,768 | 5,659 | 5,642 | 5,600 |
| Total | 11,429 | 11,405 | 11,419 | 11,404 | 11,389 |
| 77° F | 1,873 | 2,029 | 2,028 | 2,044 | 2,020 |
|  | 2,130 | 1,970 | 1,973 | 1,977 | 1,973 |
| Total | 4,003 | 3,999 | 4,001 | 4,021 | 3,993 |
| 300° F | 56.30 | 58.91 | 61.73 | 62.65 | 59.93 |
|  | 63.02 | 61.66 | 58.30 | 58.66 | 60.74 |
| Total | 119.32 | 120.57 | 120.03 | 121.31 | 120.67 |

The accuracy of the resistance measurement can also be checked or proved graphically. By proper proportioning and placing of the scales or ranges of resistance at the calibration temperatures a chart can be prepared on which the matching and proofing points of the nominal curve, and also of the curves of various selected tolerances above and below the nominal, will connect as straight lines. The match point and check point values of the matched thermistor elements can then be plotted in, and they will also connect as straight or nearly straight lines, if the resistance measurements of the individual thermistor elements have been accurate.

But if an error has been made that will be visually signalled by the substantially non-straight line which it will be necessary to draw to connect the three points.

Upon discovery of measuring error in this way, it may under a safe procedure be assumed that the error is at one or the other of the two limit or outer temperatures, and two straight lines can be drawn from the limit points through the assumed-to-be-correct center or check point, to show the extent of both possibilities of error. Whether or not the composite unit should be rejected can then be determined by inspection, that is, by noting whether either of the straight lines crosses a limit curve within the outer match points.

By the use of either and/or both of the above described tabular and graphic methods of checking or proving the accuracy of the measurements and computations I have found that the manual practice of the matching technique is made virtually foolproof. That is, substantially no manually matched composite thermistors have failed in use to conform to the nominal within the prescribed tolerance, showing that the possibility of human error is virtually nil when the composite thermistors are compared to the nominal at the otherwise unnecessary third matching point.

It will be understood that the entire matching process may be performed also by machine. A manufacturing batch, say 100, of the thermistor elements can be supported in the constant temperature bath on a rack or "hat," to which there can be electrically connected an automatic digital test set. The test set or unit is operated to automatically sequence or switch through the group of thermistor elements, say at the rate of one per second. Coincident with this sequential scanning or reading of the thermistor elements the test set will automatically punch and flip a series of element-corresponding cards or the like, in the similar timed sequence, and record the resistance and sequence number of each element.

The obtaining of the element resistance values in this automatic way is then continued through the second and if desired third nominal-matching temperatures, by merely shifting the "hat" from one constant temperature bath to the next, and repeating the sequencing of the elements and the correlated punching and flipping of the cards.

The file or series of element data cards may then be carried or fed into an automatic computer device, which will have been programmed with the nominal and limit values for the particular desired resistance-temperature curve. The computer will take the first card and automatically sequence or scan the rest to find a match first at one and successively at the other matching temperatures, and will then print the numbers of the matched pairs or pluralities of thermistor elements on a tape.

It will be appreciated that the computer must sequence the entire batch for each of the multiple matchings, performing a select-reject operation only and without the short-cut of making the initial matching selection directly from those elements shown to vary equally-oppositely from the nominal, as heretofore noted in the description of the invention as manually practiced. But of course the machine sequencing can proceed at a very much faster rate than the manual matching, and can determine all the available matching element pairs or pluralities in a given manufacturing batch in a matter of a few seconds.

It will be understood that not all thermistor elements of a given batch are necessarily susceptible of being matched as were all ten elements of the stated example, and further that the percentage of the batch which may successfully be matched in accordance with the invention varies with the tolerance used. The selected resistance-temperature curve may be whatever is desired, but the determining of the nominal curve by the aforementioned technique of averaging a batch to derive objective identical resistance values serves manufacturing convenience because it establishes a nominal curve for which the greatest percentage of matching pluralities may be found from the given manufacturing batch. With this procedure as much as ninety percent (90%) of a manufacturing batch may be matched in composite thermistors of the invention conforming to the nominal to within a tolerance of one percent (1%). This assumes of course that the thermistors to be considered will have survived such preliminary test as may be required under quality control procedures.

It should be pointed out also that the objective identical resistance values can be conformed to the averages of a number of element batches made up to a particular specification. That is, the nominal resistances can be found from the first batch, and if the values obtained for the subsequent batches show the objective identical resistances to differ from those most characteristic of all the batches, the said initially found nominal resistances can then be revised upward or downward as appropriate.

Variously, if a subsequent batch is found to average higher or lower than the initial batch, then a following batch may be adjusted in structure, as in thickness, to have an average deviating from the first correspondingly as but in the direction opposite to the second. It is recognized that the several batches can be controlled for convenient averaging also as to slope, as by varying the firing process for, or the percentage composition of, the thermistor elements.

Figure 5:
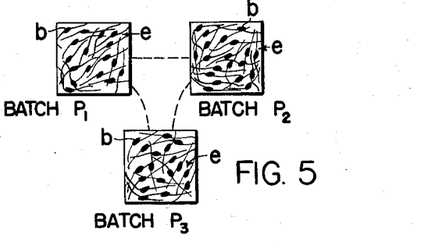
FIG. 5 similarly represents a plurality of such manufacturing batches.

Also the element matchings may be made from any number of batches taken together, as represented in FIG. 5 by the broken lines connecting the batches $P_1$, $P_2$, and $P_3$ therein.

Figure 1:
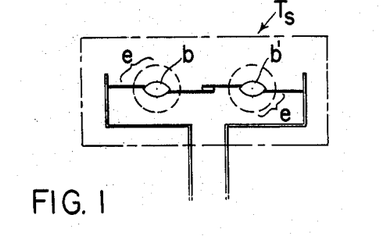
FIG. 1 is a schematic diagram of one embodiment of thermistor assembly or unit device.
Figure 2:
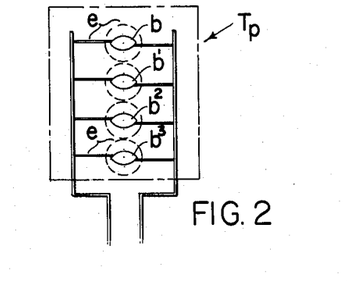
FIG. 2 is a similar schematic diagram of another thermistor unit embodying the invention.

It is here again pointed out that the described uniform resistance-temperature characteristics over an entire lot of composite thermistors of the invention prevails whether the plurality of elements $e$ therein be connected in series as for example in FIG. 1 or in parallel as in the example of FIG. 2, or in combinations of series and parallel connections. In said figures the component bodies of semi-conductor material are indicated at $b$, $b_1$, etc., and as having been removed from the aforementioned envelopes and their terminals electrically connected in the desired composite assembly. In a given thermistor unit the bodies may be coated, capsuled or housed individually or commonly for the plurality, as represented by the small dotted-line enclosures around the bodies. Each such composite thermistor unit, designated $T_s$ for the series form of FIG. 1 and $T_p$ for the parallel form of FIG. 2, may have a holder, base, frame or other unifying support, as indicated by the encompassing dot-and-dash lines in FIGS. 1 and 2.

It is again explained also that with a parallel-element thermistor, such as $T_p$ of FIG. 2, and assuming for example a two-element unit, the total resistance for such parallel pair is half that of the average value of the batch from which it is derived, rather than twice such average value as in the serial-element assembly of the specific example earlier herein described. Similarly in the instances of larger numbers of elements $e$ in parallel assembly, as for example the unit-of-four $T_p$ represented illustratively in FIG. 2, the selection resistance value is one-fourth of the batch value, and similarly for other numbers of elements $e$ per unit. Likewise with more than two series-connected elements per unit, as compared with the pair thereof in unit $T_s$, FIG. 1, the average or other batch values are multiplied by such number of elements $e$ such as 3, 4 or more.

The composite thermistor units made up by parallel connection of a larger number—as four, five, or six—of the thermistor elements will be understood to be advantageous or preferred in applications requiring fast response and high power handling capacity.

In the production of those composite thermistor units of the invention comprising parallel-connected pluralities of two or more of the thermistor elements, it is more convenient to determine the conductivities (i.e. the reciprocals) than the resistances of the thermistor elements, and then add the individual conductivities in the averaging and matching. Of course any other standard means of calculating parallel resistances may be availed of as yielding the same result.

Figure 3:
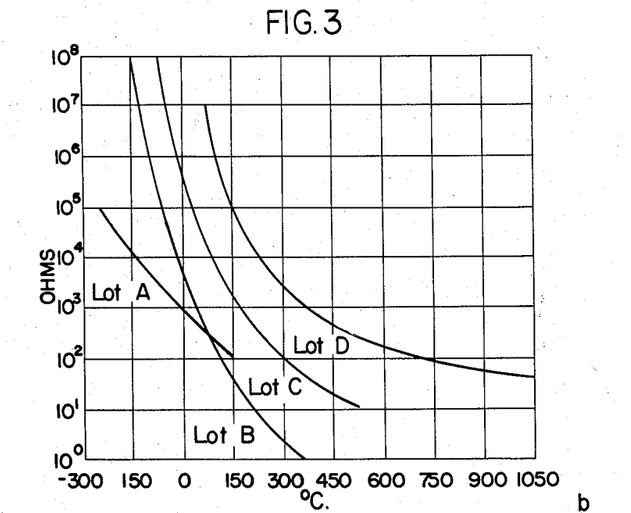
FIG. 3 shows characteristic resistance-temperature curves for several typical lots of thermistor units in accordance with the invention.

In FIG. 3 are shown the nominal resistance-temperature curves for a number of lots of the respectively uniform composite thermistor units of the invention. Thermistor Lot A for example is of the preferred metallic oxide or thermistor material determined as suitable for operation to very low temperatures such as −250° to 150° C. Lot B is of the appropriate semi-conductor material for somewhat higher temperature ranges such as −150° to 300° C. Lot C is of the appropriate semi-conductor material for the range of −50° to 500° C., while in Lot D the material is of the specialized composition affording useful thermistor performance over even greater temperature ranges such as 100° to 1000° C. For each such lot the resistance-temperature values are represented by the single curve. Each individual composite thermistor unit of the particular lot is so nearly or exactly identical with every other unit of that lot, with the tolerances made possible by the invention and of as little as ±0.1%, that on the scale of FIG. 3 its temperature-resistance characteristic will approximate the nominal so closely as to be comprehended within the width of the lines by which the nominal curves A, B, C, and D are drawn.

It has been pointed out heretofore that each individual composite thermistor will have its own approximation to the nominal curve, within the tolerance limits, and that of any lot some thermistors will lie above, some will lie below, and some will extend across the nominal. It has been shown further that in their uniform progression relative to the nominal from one matching point to the other some thermistors will parallel, some will close to, and some will open from the nominal.

Figure 7:
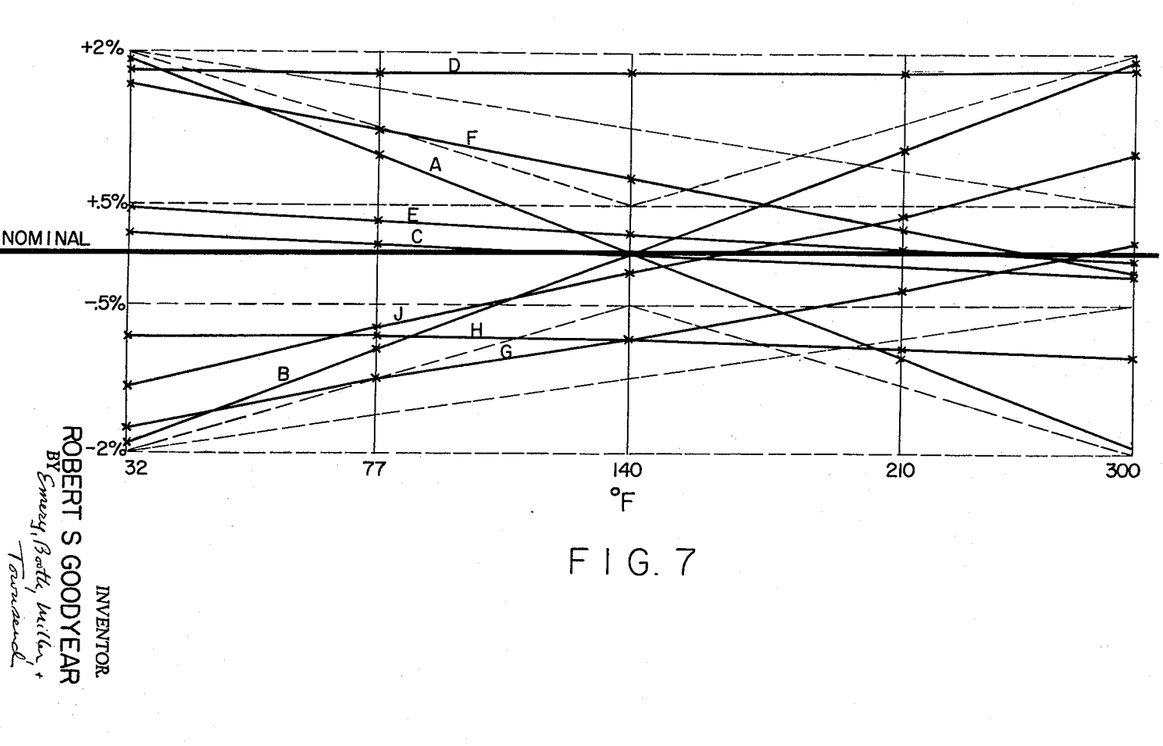
FIG. 7 compares the deviations from a nominal curve of the temperature-resistance curves of a number of thermistor units in accordance with the invention.

It will be understood that under the invention method the composite thermistors may be matched to within the same or different tolerances at two or more than two points along the nominal curve. The envelopes within which the composite thermistors may be matched may, then, have a uniform tolerance, a tapered tolerance, or a reverse taper or hourglass tolerance. This will be clear from an exemplary thermistor matching, as tabulated below and graphed in FIG. 7, to the hereinbefore mentioned temperature-resistance curve having the following resistances in ohms at the following five matching points, of which the interior ones are used merely for purposes of illustration:

| 32° | 77° | 140° | 210° | 300° |
|---|---|---|---|---|
| 11,500 | 4,002 | 1,166 | 380.3 | 120.3 |

Consider the following eighteen thermistor elements from a manufactured batch and having resistance values at the five matching points measured as follows:

| No. | 32° F. | 77° F. | 140° F. | 210° F. | 300° F. |
|---|---|---|---|---|---|
| 1 | 6,584 | 2,295 | 663 | 214.5 | 67.3 |
| 2 | 5,330 | 1,943 | 590 | 199.4 | 65.3 |
| 3 | 6,300 | 2,232 | 657 | 216.6 | 69.2 |
| 4 | 4,866 | 1,720 | 505 | 166.0 | 52.9 |
| 5 | 5,602 | 1,985 | 585 | 192.7 | 61.6 |
| 6 | 6,095 | 2,130 | 617 | 200.4 | 63.1 |
| 7 | 5,992 | 2,062 | 587 | 187.1 | 57.8 |
| 8 | 6,960 | 2,447 | 714 | 233.3 | 73.9 |
| 9 | 6,290 | 2,100 | 576 | 177.3 | 52.7 |
| 10 | 4,950 | 1,738 | 507 | 165.2 | 52.3 |
| 11 | 5,515 | 1,944 | 570 | 186.7 | 59.4 |
| 12 | 5,208 | 1,887 | 569 | 191.7 | 62.6 |
| 13 | 5,887 | 2,056 | 596 | 193.3 | 60.8 |
| 14 | 5,830 | 2,044 | 595 | 193.8 | 61.2 |
| 15 | 5,423 | 1,912 | 560 | 183.4 | 58.3 |
| 16 | 5,578 | 1,975 | 581 | 191.1 | 61.0 |
| 17 | 4,640 | 1,607 | 461 | 148.1 | 46.2 |
| 18 | 5,590 | 1,962 | 571 | 186.1 | 58.8 |

Assuming that pairing of elements is desired for the composite thermistors, and that the pairs are to be matched within a tolerance limit of 2%, then the eighteen thermistor elements may be paired as shown in the following table on which the percentage deviation for each pair is shown at each matching point.

PAIR A

| Nos. | 32° F. | 77° F. | 140° F. | 210° F. | 300° F. |
|---|---|---|---|---|---|
| 2 | 5,330 | 1,943 | 590 | 199.4 | 65.3 |
| 9 | 6,290 | 2,100 | 576 | 177.3 | 52.7 |
| Total | 11,620 | 4,043 | 1,166 | 376.7 | 118.0 |
| Percent dev. | +1.93 | +1.02 | 0 | −.95 | −1.91 |

PAIR B

| | 32° F. | 77° F. | 140° F. | 210° F. | 300° F. |
|---|---|---|---|---|---|
| 5 | 5,602 | 1,985 | 585 | 192.7 | 61.6 |
| 16 | 5,578 | 1,975 | 581 | 191.1 | 61.0 |
| Total | 11,180 | 3,960 | 1,166 | 383.8 | 122.6 |
| Percent dev. | −1.93 | −1.05 | 0 | +.92 | +1.91 |

PAIR C

| | 32° F. | 77° F. | 140° F. | 210° F. | 300° F. |
|---|---|---|---|---|---|
| 14 | 5,830 | 2,044 | 595 | 193.8 | 61.2 |
| 18 | 5,590 | 1,962 | 571 | 186.1 | 58.8 |
| Total | 11,420 | 4,006 | 1,166 | 379.9 | 120.0 |
| Percent dev. | +.18 | +.10 | 0 | −.11 | −.25 |

PAIR D

| | 32° F. | 77° F. | 140° F. | 210° F. | 300° F. |
|---|---|---|---|---|---|
| 6 | 6,095 | 2,130 | 617 | 200.4 | 63.1 |
| 11 | 5,515 | 1,944 | 570 | 186.7 | 59.4 |
| Total | 11,610 | 4,074 | 1,187 | 387.1 | 122.5 |
| Percent dev. | +1.84 | +1.80 | +1.80 | +1.79 | +1.83 |

PAIR E

| | 32° F. | 77° F. | 140° F. | 210° F. | 300° F. |
|---|---|---|---|---|---|
| 1 | 6,584 | 2,295 | 663 | 214.5 | 67.3 |
| 4 | 4,866 | 1,720 | 505 | 166.0 | 52.9 |
| Total | 11,450 | 4,015 | 1,168 | 380.5 | 120.2 |
| Percent dev. | +.44 | +.32 | +.17 | +.05 | −.08 |

PAIR F

| | 32° F. | 77° F. | 140° F. | 210° F. | 300° F. |
|---|---|---|---|---|---|
| 8 | 6,960 | 2,447 | 714 | 233.3 | 73.9 |
| 17 | 4,640 | 1,607 | 461 | 148.2 | 46.2 |
| Total | 11,600 | 4,054 | 1,175 | 381.5 | 120.1 |
| Percent dev. | +1.75 | +1.30 | +.77 | +.32 | −.17 |

PAIR G

| | 32° F. | 77° F. | 140° F. | 210° F. | 300° F. |
|---|---|---|---|---|---|
| 7 | 5,992 | 2,062 | 587 | 187.1 | 57.8 |
| 12 | 5,208 | 1,887 | 569 | 191.7 | 62.6 |
| Total | 11,200 | 3,949 | 1,156 | 378.8 | 120.4 |
| Percent dev. | −1.75 | −1.32 | −.86 | −.39 | +.08 |

PAIR H

| | 32° F. | 77° F. | 140° F. | 210° F. | 300° F. |
|---|---|---|---|---|---|
| 13 | 5,887 | 2,056 | 596 | 193.3 | 60.8 |
| 15 | 5,423 | 1,912 | 560 | 183.4 | 58.3 |
| Total | 11,310 | 3,968 | 1,156 | 376.7 | 119.1 |
| Percent dev. | −.79 | −.85 | −.86 | −.95 | −1.00 |

PAIR J

| | 32° F. | 77° F. | 140° F. | 210° F. | 300° F. |
|---|---|---|---|---|---|
| 3 | 6,300 | 2,232 | 657 | 216.6 | 69.2 |
| 10 | 4,950 | 1,738 | 507 | 165.2 | 52.3 |
| Total | 11,250 | 3,970 | 1,164 | 381.8 | 121.5 |
| Percent dev. | −1.32 | −.80 | −.17 | +.39 | +1.00 |

To illustrate the distribution of and tolerance envelope possibilities with the invention thermistors, the nominal curve is shown as a solid straight line in FIG. 7, and the ±.5% and +2% deviation points are shown as spaced from the nominal at the matching points so as to be connectible by straight dashed lines paralleling the nominal. Thus the solid line matched pair curves A through J (omitting I), plotted by their percentage deviation at the match point temperatures, and which under the invention progress uniformly relative to the nominal from one end of the range to the other, are also seen as straight lines, within the limits of accuracy of measurement.

Referring still to FIG. 7, parallel .5% and 2% tolerance lines will be understood to define uniform tolerance envelopes within which thermistors can be matched under the invention. A representative tapered tolerance envelope is shown by the dashed lines drawn from ±2% at 32° F. to ±.5% at 300° F. What is meant by a reverse taper or hourglass envelope is indicated by the dashed lines drawn from ±2% at 32° and 300° F. inward to .5% at 140° F.

Considering now the distribution of the composite thermistor pairs and the matching possibilities therewith, it will be seen from FIG. 7 that all pairs will satisfy a uniform 2% tolerance requirement; that pairs C and E match to within a uniform tolerance of .5%; and that pairs C, E, F and G match to within the tapered tolerance lines from ±2% at 32° F. to 5% at 300° F.

The significance of the hourglass tolerance lines is that in some applications the limit of tolerance may be much closer to the nominal at some intermediate point in the range than it is required to be at the extremities of the operating range. From FIG. 7 it is seen that from among the nine pairs matched to within the 2% tolerance limit at 32° and 300° F. pairs A, B, C, E, and J also match to within the much closer tolerance of .5% which may be required at the intermediate 140° F. point.

From the foregoing it will again be seen that the composite thermistors of the invention may be matched to within any desired tolerances at two or more than two matching points, and that the unlimited choice of tolerances and number of matching points may define tolerance envelopes varying between uniform or parallel, tapered or conical, and reverse or hourglass (which may or may not be duplicate) forms.

It is here again pointed out that thermistors matched under the invention to within a predetermined tolerance at the two matching points on the curve will be within the same tolerance over the whole curve. Further, with the nominal indicated as in FIG. 7 the paired element or other composite thermistors matched to within one tolerance at one matching point and to within another tolerance at another matching point can be joined by straight lines to show their deviation from the nominal at all points in between. And where, as in many applications, the tolerance requirements are not uniform across the operating range, the matching can be to obtain the larger number of thermistors which fall within the envelope tapering to the larger tolerance limit than lie within the envelope held uniform at the smaller limit.

The herein disclosed method makes it possible to produce thermistors having identical predetermined resistance-temperature characteristic over any temperature range through which the given thermistor is intended for use, and to any desired tolerance. Upon completion of manufacture they are ready for installation at the appropriate use location, without having to resort to additional resistors or other devices in some relatively complex network such as usually heretofore necessary to obtain the required performance characteristics. The result is a product from ten to one hundred times more precise than anything it has been possible to produce in the past and at a cost markedly less than the cost of producing thermistor and resistor networks.

This application is a continuation-in-part of my copending application Serial No. 15,250, filed March 7, 1960, with application in turn is a continuation-in-part of my then copending application Serial No. 738,559, filed May 28, 1958, now abandoned.

It will be understood that my invention is not limited to the exemplary embodiments or steps herein illustrated or described, and I set forth its scope in my following claims:

1. In the manufacture of thermistors, the method which comprises the steps of (a) preparing batch quantities of finely divided semi-conductor material for fabricating as similar thermistors,
(b) subjecting the material to sintering heat and thereby agglomerating it to form bodies for the thermistors,
(c) applying electrically conductive materials to said bodies to constitute them as thermistor elements,
(d) assembling said elements in pluralities whose composite resistance has a first predetermined value within a selected tolerance at one point in an elected temperature range, and
(e) utilizing from said assembled element pluralities those pluralities whose composite resistance has a second predetermined value within a selected tolerance at another spaced point in said elected temperature range by then connecting those latter pluralities together to form composite thermistor units whose resistance-temperature curves are identical within the selected tolerance throughout said elected temperature range.

2. The method of manufacturing thermistors conforming to a nominal resistance-temperature curve to within a determined close tolerance which comprises
(a) preparing at least one batch quantity of powderous semi-conductor material and subjecting that to sintering heat treatment to agglomerate thermistor bodies of a composition and structure adapted for use in a given temperature range,
(b) applying electrically conductive terminals to said bodies to form them as thermistor elements,
(c) performing measurements to determine the resistance values of said thermistor elements at at least two spaced points in said temperature range,
(d) correlating those like pluralities of said elements whose composite resistance matches that of said nominal curve to within a determined close tolerance at one of said spaced temperature points,
(e) assembling from said correlated pluralities those like pluralities of said thermistor elements whose composite resistance matches that of said nominal curve to within a determined close tolerance also at the other of said spaced temperature points, and
(f) electrically connecting the terminals of said assembled pluralities to form composite thermistors whose resistance-temperature curves match said nominal resistance-temperature curve to within the determined close tolerances throughout said given temperature range.

3. The method of manufacturing composite thermistors having resistance-temperature curves which are identical within a determined close tolerance over a given operating temperature range which comprises the steps of
(a) preparing a batch of semi-conductor material in a form appropriate for thermistor use over the given temperature range,
(b) agglomerating therefrom under sintering heat treatment a multiplicity of thermistor bodies,
(c) applying electrically conductive terminals to said bodies to constitute them as thermistor elements,
(d) segregating pluralities of said elements whose resistance in the desired composite combination corresponds within a determined close tolerance to a resistance which is characteristic of the elements of said batch at one point in said given operating range,
(e) withdrawing from said segregated pluralities those pluralities whose resistance in the desired composite combination corresponds within a determined close tolerance to a resistance which is characteristic of said batch at a temperature point substantially spaced from said one point in said given operating range, and
(f) electrically connecting the terminals of the withdrawn pluralities in the desired composite combinations.

4. The method of making composite thermistors with resistance-temperature characteristics conforming to a nominal resistance-temperature curve to within a determined close tolerance which comprises
(a) preparing a batch of thermistor elements for use in a desired operating range,
(b) measuring and recording the resistances of said elements at one temperature point in said operating range,
(c) measuring and recording the resistances of said elements at another temperature point in said operating range which is substantially spaced from said one temperature point,
(d) identifying from among said batch those element pluralities whose resistance in the desired composite combination conforms to said nominal curve within a determined close tolerance at said one temperature point,
(e) taking from said identified pluralities those pluralities whose resistance in the desired composite combination conforms also to said nominal curve within a determined close tolerance at said other point in said operating range, and
(f) assembling and electrically connecting those taken pluralities in the desired composite combination and thereby forming composite thermistors whose resistance-temperature characteristics conform to said nominal curve within a determined close tolerance at every temperature point in said desired operating range.

5. The method of manufacturing composite thermistors having substantially identical resistance-temperature characteristics which comprises
(a) preparing batch quantities of finely divided semi-conductor material for fabricating as thermistors for use in an elected operative range,
(b) subjecting the material to sintering heat and thereby agglomerating it to form bodies for the thermistors,
(c) applying electrically conductive terminals to said bodies to constitute them as thermistor elements,
(d) measuring the resistances of said thermistor elements at one temperature point in said elected operative range,
(e) measuring the resistances of said elements at a temperature point spaced from said one point in said elected operative range,
(f) making from among said thermistor elements a first selection of element pluralities whose resistance in the desired composite number and arrangement conforms substantially to a nominal resistance-temperature curve at one of said spaced temperature points,
(g) making from said first selection a second selection of element pluralities whose resistance in the same composite number and arrangement conforms substantially to said nominal resistance-temperature curve at the other of said spaced temperature points, and
(h) assembling said second selected pluralities of thermistor elements in said composite number and arrangement and electrically connecting their terminals to constitute them as the desired composite thermistor units.

References Cited in the file of this patent
UNITED STATES PATENTS

| | | |
|---|---|---|
| 1,192,911 | Leeds | Aug. 1, 1916 |
| 2,609,644 | Brown et al. | Sept. 9, 1952 |
| 2,664,486 | Colpitts | Dec. 29, 1953 |
| 2,720,573 | Lundqvist | Oct. 11, 1955 |
| 2,953,759 | Lehovec | Sept. 20, 1960 |